(12) United States Patent
Nemoto et al.

(10) Patent No.: US 10,577,708 B2
(45) Date of Patent: *Mar. 3, 2020

(54) MULTI-LAYERED COATING FILM FORMATION METHOD

(71) Applicant: KANSAI PAINT CO., LTD., Hyogo (JP)

(72) Inventors: Yukihiro Nemoto, Kanagawa (JP); Hideki Matsuda, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/906,018

(22) PCT Filed: Aug. 8, 2014

(86) PCT No.: PCT/JP2014/071095
§ 371 (c)(1),
(2) Date: Jan. 19, 2016

(87) PCT Pub. No.: WO2015/022920
PCT Pub. Date: Feb. 19, 2015

(65) Prior Publication Data
US 2016/0153107 A1 Jun. 2, 2016

(30) Foreign Application Priority Data

Aug. 13, 2013 (JP) .................................. 2013-168373
Apr. 28, 2014 (JP) .................................. 2014-092915

(51) Int. Cl.
| | | |
|---|---|---|
| *C25D 9/02* | (2006.01) | |
| *C23C 22/34* | (2006.01) | |
| *C25D 13/20* | (2006.01) | |
| *C09D 5/44* | (2006.01) | |
| *C23C 22/36* | (2006.01) | |
| *C23C 22/83* | (2006.01) | |
| *C25D 13/22* | (2006.01) | |
| *C09D 163/00* | (2006.01) | |
| *C09D 175/04* | (2006.01) | |

(Continued)

(52) U.S. Cl.
CPC .............. *C25D 9/02* (2013.01); *C09D 5/4438* (2013.01); *C09D 5/4453* (2013.01); *C09D 163/00* (2013.01); *C09D 175/04* (2013.01); *C23C 22/34* (2013.01); *C23C 22/36* (2013.01); *C23C 22/48* (2013.01); *C23C 22/82* (2013.01); *C23C 22/83* (2013.01); *C25D 5/34* (2013.01); *C25D 7/00* (2013.01); *C25D 13/20* (2013.01); *C25D 13/22* (2013.01); *C25D 13/12* (2013.01)

(58) Field of Classification Search
CPC . C25D 9/02; C25D 7/00; C25D 13/20; C25D 13/22; C25D 13/12; C25D 5/34; C25D 5/48; C25D 11/26; C25D 9/08; C09D 5/4438; C09D 5/4453; C09D 163/00; C09D 175/04; C09D 5/08; C09D 5/4473; C09D 5/448; C23C 22/34; C23C 22/364; C23C 22/00; C23C 22/80; C23C 22/78; C23C 22/73; C23C 26/00; C23C 26/632615; C23C 26/015; C23C 22/361; C23C 28/021; C23C 22/07; C23C 30/00; Y10T 428/12937

See application file for complete search history.

(56) References Cited

U.S. PATENT DOCUMENTS

| | | | |
|---|---|---|---|
| 5,336,336 A | 8/1994 | Matsuda | |
| 6,758,916 B1 * | 7/2004 | McCormick | ............ C23C 22/34 148/247 |

(Continued)

FOREIGN PATENT DOCUMENTS

| | | |
|---|---|---|
| CN | 101400827 | 4/2009 |
| EP | 1 669 476 | 6/2006 |

(Continued)

OTHER PUBLICATIONS

International Search Report dated Nov. 4, 2014 in corresponding International (PCT) Application No. PCT/JP2014/071095.

(Continued)

*Primary Examiner* — Xiuyu Tai
(74) *Attorney, Agent, or Firm* — Wenderoth, Lind & Ponack, L.L.P.

(57) ABSTRACT

A problem to be solved by the present invention is to provide a method for forming a multilayer coating film, the method being capable of achieving excellent finished appearance and excellent corrosion resistance without affecting electrodeposition coatability even when a part or all of the water-washing step is omitted after chemical conversion treatment, and to provide a coated article. The invention provides a method for forming a multilayer coating film, comprising forming a chemical conversion coating film and an electrodeposition coating film on a metal substrate by Step 1 of immersing a metal substrate in a chemical conversion treatment solution to form a chemical conversion coating film, and Step 2 of omitting a part or all of the water-washing step, and performing electrodeposition coating on the metal substrate using a cationic electrodeposition coating composition to form an electrodeposition coating film, wherein when the electrodeposition coating is performed in Step 2, the solution adhered to and/or deposited on the metal substrate has an electrical conductivity of less than 10,000 μS/cm.

14 Claims, 1 Drawing Sheet

(51) Int. Cl.
*C23C 22/48* (2006.01)
*C23C 22/82* (2006.01)
*C25D 5/34* (2006.01)
*C25D 7/00* (2006.01)
*C25D 13/12* (2006.01)

(56) References Cited

U.S. PATENT DOCUMENTS

| | | | |
|---|---|---|---|
| 9,115,440 | B2 | 8/2015 | Kubota |
| 2004/0144451 | A1 | 7/2004 | Matsukawa et al. |
| 2006/0147735 | A1 | 7/2006 | Matsukawa et al. |
| 2009/0101512 | A1 | 4/2009 | Kubota |
| 2009/0208716 | A1 | 8/2009 | Kaneko et al. |
| 2010/0243465 | A1 | 9/2010 | Inbe et al. |
| 2010/0270162 | A1* | 10/2010 | Nishiguchi .......... C08G 18/643 205/50 |
| 2015/0292103 | A1 | 10/2015 | Nemoto |
| 2016/0153107 | A1 | 6/2016 | Nemoto et al. |

FOREIGN PATENT DOCUMENTS

| | | |
|---|---|---|
| EP | 3 029 179 | 6/2016 |
| JP | 56-065997 | 6/1981 |
| JP | 61-190098 | 8/1986 |
| JP | 61-287471 | 12/1986 |
| JP | 63-302990 | 12/1988 |
| JP | 3-180489 | 8/1991 |
| JP | 6-2157 | 1/1994 |
| JP | 6-157949 | 6/1994 |
| JP | 8-141598 | 6/1996 |
| JP | 9-78291 | 3/1997 |
| JP | 2001-323384 | 11/2001 |
| JP | 2002-212790 | 7/2002 |
| JP | 2004-218070 | 8/2004 |
| JP | 2004-218072 | 8/2004 |
| JP | 2004-218073 | 8/2004 |
| JP | 3558392 | 8/2004 |
| JP | 2007-238999 | 9/2007 |
| JP | 2009-149974 | 7/2009 |
| JP | 5828929 | 12/2015 |
| WO | 2009/041616 | 4/2009 |

OTHER PUBLICATIONS

Extended European Search Report dated Mar. 7, 2017 in corresponding European Application No. 14836870.7.
Office Action dated Mar. 2, 2017 in corresponding Chinese Application No. 201480044723.X, with English Translation.
Office Action dated Nov. 3, 2017 in Chinese Application No. 201480044723.X, with English Translation.
Shaoyan Fu, Coating Process and Workshop Design Manual, Machinery Industry Press, 1st edition, Jan. 2013, pp. 220-221.
Tanimura, "Practice and Future of Cathodic Electrodeposition Coating Technology", Jitsumu Hyomen Gijutsu, vol. 31, No. 12, 1984, pp. 512-523, with partial English translation.
Sato et al., "Effect of Inorganic Anions Contained in Rising water of Electrodeposition on Film Performance", Journal of the Japan Society of Color Material, vol. 42, No. 2, 1969, pp. 66-72, with partial English translation.
Notification of Reasons for Refusal dated Jun. 12, 2018 in Japanese Patent Application No. 2015-090382, with Machine Translation.

* cited by examiner

MULTI-LAYERED COATING FILM FORMATION METHOD

CROSS-REFERENCE OF RELATED APPLICATIONS

This application claims priority to JP2013-168373A, filed Aug. 13, 2013; and JP2014-092915A, filed Apr. 28, 2014, the disclosures of which are incorporated herein by reference in their entirety.

TECHNICAL FIELD

The present invention relates to a method for forming a multilayer coating film, the method being capable of performing electrodeposition coating without being affected by a solution adhered (attached or bonded) to and/or deposited on a metal substrate after chemical conversion treatment even when a part or all of the water-washing step is omitted after chemical conversion treatment, and being capable of thereby providing a coated article having excellent finished appearance and excellent corrosion resistance. The present invention also relates to a coated article obtained using this method for forming a multilayer coating film.

BACKGROUND ART

Until now, metal substrates for industrial use have been subjected to chemical conversion treatment for treating the base surface to improve corrosion resistance and adhesion. However, chemical conversion treatment solutions contain large amounts of various ionic components, as well as large amounts of heavy metal components, such as zinc, nickel, and manganese, to improve the properties of the resulting chemical conversion coating film.

When electrodeposition coating is performed using a cationic electrodeposition coating composition directly after the chemical conversion treatment, it is known that excess chemical conversion treatment solution adhered to or deposited on the metal substrate adversely affects the electrodeposition coatability, finished appearance, corrosion resistance, and the like.

Figure 1:
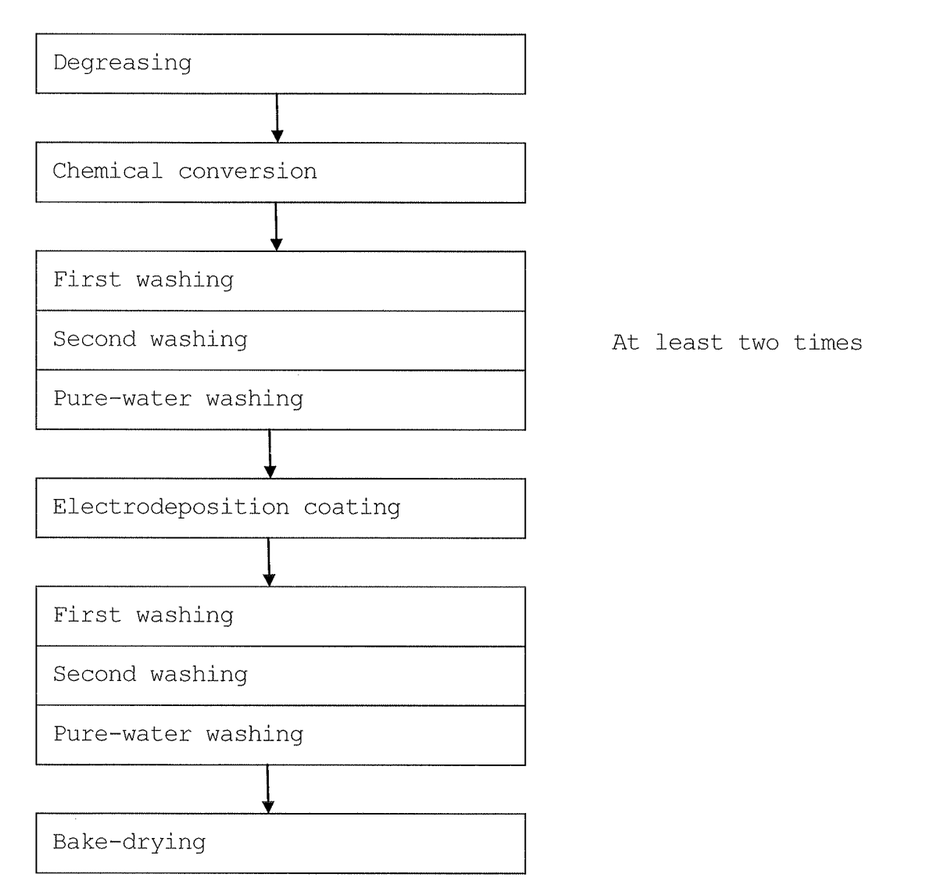
FIG. 1 shows a schematic flow of a known method for forming a multilayer coating film.

Therefore, a typical coating line includes a water-washing step, which requires a considerable number of steps and time for degreasing treatment, chemical conversion treatment, first water-washing, second water-washing, pure-water washing, electrodeposition coating, first water-washing, second water-washing, pure-water washing, and bake-drying, as shown in FIG. 1. Furthermore, collection, filtration, treatment, disposal, etc., of wastewater from the water-washing step also require massive equipment and costs.

Patent Literature (PTL) 1 discloses a method for forming a multilayer coating film that enables process-streamlining and space-saving. In this method, electrodeposition coating is performed without performing water-washing after chemical conversion treatment. PTL 1 discloses that even when a chemical conversion treatment solution is brought as a contaminant into an electrodeposition coating composition in the subsequent step, it is possible to obtain a coated article with excellent finished appearance and excellent corrosion resistance, without affecting electrodeposition coatability and coating film properties. However, when water-washing is not performed, and if a solution having an electrical conductivity higher than a certain level is adhered to and/or deposited on the substrate, sufficient corrosion resistance and finished appearance might not be achieved.

Patent Literature (PTL) 2 discloses a method for performing chemical conversion treatment by dipping treatment using an acidic zinc phosphate aqueous solution. In relation to this, PTL 2 defines the sodium ion concentration in the zinc nitrite aqueous solution used as an accelerator. PTL 2 discloses in paragraph [0016] that when the sodium ion concentration is 10,000 ppm on a weight basis in a chemical conversion treatment tank, an excellent chemical conversion coating film is obtained. However, when sodium ions are contained at such a high concentration, the electrical conductivity is also high, and the water-washing step cannot be omitted. It is thus difficult to achieve process-streamlining and space-saving.

Patent Literature (PTL 3) discloses a method for chemical conversion treatment that is capable of producing a high-quality chemical conversion film. In relation to this method, PTL 3 discloses in paragraph [0063] that the electrical conductivity of the chemical conversion treatment solution is controlled to about 10 to 200 mS/cm (10,000 to 200,000 µS/cm). When the chemical conversion treatment solution has such a high electrical conductivity, sufficient washing is a necessity, and the washing step cannot be omitted. Therefore, achieving process-streamlining and space-saving is difficult.

CITATION LIST

Patent Literature

PTL 1: JP2009-149974A
PTL 2: JP2001-323384A
PTL 3: JPH06-002157A

SUMMARY OF INVENTION

Technical Problem

An object of the present invention is to provide a method for forming a multilayer coating film, the method enabling process-streamlining and space-saving. Another object of the present invention is to provide a coated article that has excellent finished appearance and excellent corrosion resistance without affecting electrodeposition coatability, even when a part or all of the water-washing step after chemical conversion treatment is omitted.

Solution to Problem

The present inventor conducted extensive research, and found that in a method for forming a multilayer coating film comprising forming a chemical conversion coating film on a metal substrate and then performing electrodeposition coating, process-streamlining and space-saving as well as excellent coating film performance can be achieved by controlling to a specific range the electrical conductivity of a solution adhered to and/or deposited on the metal substrate before the electrodeposition coating. The present invention has been accomplished based on this finding.

More specifically, the present invention provides the following methods for forming a multilayer coating film and coated article.

Item 1. A method for forming a multilayer coating film, the method comprising forming a chemical conversion coating film and an electrodeposition coating film on a metal substrate by the following steps:

Step 1: immersing a metal substrate in a chemical conversion treatment solution to form a chemical conversion coating film; and Step 2: performing electrodeposition coating on the metal substrate by using a cationic electrodeposition coating composition to form an electrodeposition coating film, wherein when the electrodeposition coating is performed in Step 2, the solution adhered to and/or deposited on the metal substrate has an electrical conductivity of less than 10,000 µS/cm.

Item 2. The method for forming a multilayer coating film according to Item 1, wherein in Step 2, a part or all of the water-washing step before electrodeposition coating is omitted.

Item 3. The method for forming a multilayer coating film according to Item 1 or 2, wherein when the electrodeposition coating is performed in Step 2, the solution adhered to and/or deposited on the metal substrate has an electrical conductivity of more than 60 µS/cm and less than 7,000 µS/cm.

Item 4. The method for forming a multilayer coating film according to any one of Items 1 to 3, wherein the solution adhered to and/or deposited on the metal substrate contains less than 500 ppm of sodium ions, based on the mass of the solution.

Item 5. The method for forming a multilayer coating film according to any one of Items 1 to 4, wherein the solution adhered to and/or deposited on the metal substrate contains less than 500 ppm of potassium ions, based on the mass of the solution.

Item 6. The method for forming a multilayer coating film according to any one of Items 1 to 5, wherein the solution adhered to and/or deposited on the metal substrate contains less than 500 ppm of calcium ions, based on the mass of the solution.

Item 7. The method for forming a multilayer coating film according to any one of Items 1 to 6, wherein the solution adhered to and/or deposited on the metal substrate contains less than 500 ppm of magnesium ions, based on the mass of the solution.

Item 8. The method for forming a multilayer coating film according to any one of Items 1 to 3, wherein the chemical conversion treatment solution contains 30 to 20,000 ppm of at least one metal compound component (M) comprising at least one metal compound selected from zirconium, titanium, cobalt, aluminum, vanadium, tungsten, molybdenum, copper, zinc, indium, bismuth, yttrium, iron, nickel, manganese, gallium, silver, and lanthanoid metals, as the total metal content (on a mass basis).

Item 9. The method for forming a multilayer coating film according to any one of Items 1 to 8, wherein the chemical conversion solution contains a zirconium compound.

Item 10. The method for forming a multilayer coating film according to any one of Items 1 to 9, wherein the chemical conversion treatment solution contains a water-dispersible or water-soluble resin composition (P) in an amount of 0.01 to 40 mass %.

Item 11. The method for forming a multilayer coating film according to any one of Items 1 to 10, wherein the cationic electrodeposition coating composition contains an amino group-containing epoxy resin (A) and a blocked polyisocyanate (B), the amino group-containing epoxy resin (A) being contained in an amount of 40 to 90 mass %, and the blocked polyisocyanate (B) being contained in an amount of 10 to 60 mass %, based on the total resin solids content.

Item 12. The method for forming a multilayer coating film according to any one of Items 1 to 11, wherein the metal substrate is subjected to at least one of air-blowing, shaking, and rotating, before performing electrodeposition coating in Step 2.

Item 13. A coated article having a multilayer coating film formed by using the method for forming a multilayer coating film of any one of Items 1 to 12.

Advantageous Effects of Invention

In the method for forming a multilayer coating film of the present invention, omitting a part or all of the water-washing step after chemical conversion treatment does not affect electrodeposition coatability, and the method can provide a coated article with excellent finished appearance and excellent corrosion resistance. According to the method for forming a multilayer coating film of the present invention, a part or all of the water-washing step can be omitted. This enables process-streamlining and space-saving, as well as reduces the size of various equipment for effluent treatment and the amount of waste products.

In the present invention, the water-washing step can be omitted (a part or all of the water-washing step is omitted to achieve process-streamlining and space-saving). Along with this, it is also possible for the present invention to achieve excellent finished appearance and excellent corrosion resistance. Although the reasons for this are not precisely known, the following are possible reasons therefor.

First, a main possible reason is that when a part or all of the water-washing step is omitted, and if electrodeposition coating is performed using a cationic electrodeposition coating composition on a metal substrate in a state in which the solution adhered to and/or deposited on the metal substrate has high electrical conductivity (i.e., the solution is adhered to and/or deposited on the metal substrate at a high concentration), the application of the electrodeposition coating composition and the coating film formation are inhibited and components with high electrical conductivity remain in the multilayer film, causing deterioration in finished appearance and/or corrosion resistance. In particular, when the concentration of ion components in the composition, such as sodium ions, potassium ions, calcium ions and/or magnesium ions, exceeds a specific level, this tendency is greater. Another possible reason is that when excess chemical conversion treatment solution (containing sodium ions, potassium ions, calcium ions, and magnesium ions) adhered to and/or deposited on the substrate is brought into an electrodeposition coating composition tank, the solution inhibits electrodeposition coating as a contaminant, thus causing deterioration of finished appearance and corrosion resistance.

Therefore, in the method for forming a multilayer coating film of the present invention, when a part or all of the water-washing step is omitted, it is believed to be important to control electrical conductivity of the solution adhered to and/or deposited on the metal substrate as well as to reduce the concentrations of sodium ions, potassium ions, calcium ions, and/or magnesium ions in the chemical conversion treatment solution to specific ranges, so as not to allow an excess of the chemical conversion treatment solution to adhere to or deposit on the substrate at a high concentration.

DESCRIPTION OF EMBODIMENTS

One preferred embodiment of the present invention is a method for forming a multilayer coating film comprising the following steps. In multilayer coating film-forming equipment comprising a chemical conversion treatment tank and an electrodeposition coating composition tank, a metal substrate is immersed in the chemical conversion treatment tank filled with a chemical conversion treatment solution to form a chemical conversion coating film on the metal substrate, with or without the application of electric current. Then, a part or all of the water-washing step is omitted, and with the electrical conductivity of the solution adhered to and/or deposited on the metal substrate being controlled to an appropriate range, the coated substrate is immersed in the electrodeposition coating composition tank filled with a cationic electrodeposition coating composition to perform electrodeposition coating.

The method for forming a multilayer film is described in detail below.

Substrate

The metal substrate used in the method for forming a multilayer coating film of the present invention is not limited as long as electrodeposition coating can be performed on the substrate. Examples of the substrate include cold-rolled steel plates, alloyed hot-dip zinc-coated steel plates, electrogalvanized steel plates, electrolytic zinc-iron duplex plated steel plates, organic-composite-plated steel plates, Al materials, Mg materials, and like metal substrates. These may be suitably used singly, as an alloy of two or more metals, or as a substrate comprising a combination of two or more metals.

These metal substrates may have optionally been subjected to degreasing, surface-conditioning, water-washing, and/or other treatments.

Chemical Conversion Treatment Solution

The composition of the chemical conversion treatment solution used in the method for forming a multilayer coating film of the present invention comprises the following metal compound component (M), and optionally a water-dispersible or water-soluble resin composition (P), and the like.

Metal Compound Component (M)

The chemical conversion treatment solution used in the method for forming a multilayer coating film of the present invention preferably contains 30 to 20,000 ppm of a metal compound component (M) as the total metal content (mass basis), in view of corrosion resistance and finished appearance.

Examples of the metal compound component (M) include zirconium compounds, titanium, cobalt, aluminum, vanadium, tungsten, molybdenum, copper, zinc, indium, bismuth, yttrium, iron, nickel, manganese, gallium, silver, lanthanoid metals (lanthanum, cerium, praseodymium, neodymium, samarium, europium, gadolinium, terbium, dysprosium, holmium, erbium, thulium, ytterbium, and lutetium), and the like. It is preferable for the metal compound component (M) to comprise a zirconium compound. These may be used singly, or in a combination of two or more.

The zirconium compound usable in the metal compound component (M) includes compounds that generate zirconium-containing ions, such as zirconium ions, oxyzirconium ions, and fluorozirconium ions. Examples of compounds that generate oxyzirconium ions include zirconyl nitrate, zirconyl acetate, zirconyl sulfate, and the like. Examples of compounds that generate fluorozirconium ions include zirconium hydrofluoric acid, sodium zirconium fluoride, potassium zirconium fluoride, lithium zirconium fluoride, ammonium zirconium fluoride, and the like. Of these, zirconyl nitrate and ammonium zirconium fluoride are particularly preferable.

Examples of compounds that generate titanium ions include titanium chloride and titanium sulfate. Examples of compounds that generate fluorotitanium ions include titanium hydrofluoric acid, sodium zirconium fluoride, potassium titanium fluoride, lithium titanium fluoride, ammonium titanium fluoride, and the like. Of these, ammonium titanium fluoride is particularly preferable.

Examples of compounds that generate cobalt ions include cobalt chloride, cobalt bromide, cobalt iodide, cobalt nitrate, cobalt sulfate, cobalt acetate, ammonium cobalt sulfate, and the like. Of these, cobalt nitrate is particularly preferable.

Examples of compounds that generate aluminum ions include aluminium phosphate, aluminium nitrate, aluminum carbonate, aluminium sulfate, aluminium acetate, aluminum formate, aluminum oxalate, aluminum lactate, aluminum malonate, aluminum tartrate, aluminum ascorbate, and the like. Of these, aluminium sulfate is particularly preferable.

Examples of compounds that generate vanadium ions include lithium orthovanadate, sodium orthovanadate, lithium metavanadate, potassium metavanadate, sodium metavanadate, ammonium metavanadate, sodium pyrovanadate, vanadyl chloride, vanadyl sulfate, and the like. Of these, ammonium metavanadate is particularly preferable.

Examples of compounds that generates tungsten ions include lithium tungstate, sodium tungstate, potassium tungstate, ammonium tungstate, sodium metatungstate, sodium paratungstate, ammonium pentatungstate, ammonium heptatungstate, sodium phosphotungstate, barium borotungstate, and the like. Of these, ammonium tungstate and the like are particularly preferable.

Examples of compounds that generate molybdenum ions include lithium molybdate, sodium molybdate, potassium molybdate, ammonium heptamolybdate, calcium molybdate, magnesium molybdate, strontium molybdate, barium molybdate, phosphomolybdic acid, sodium phosphomolybdate, zinc phosphomolybdate, and the like.

Examples of compounds that generate copper ions include copper sulfate, copper(II) nitrate trihydrate, copper(II) ammonium sulfate hexahydrate, cupric II oxide, copper phosphate, and the like. Examples of compounds that generate zinc ions include zinc acetate, zinc lactate, zinc oxide, and the like.

Examples of compounds that generate indium ions include ammonium indium nitrate and the like.

Examples of compounds that generate bismuth ions include inorganic bismuth-containing compounds, such as bismuth chloride, bismuth oxychloride, bismuth bromide, bismuth silicate, bismuth hydroxide, bismuth trioxide, bismuth nitrate, bismuth nitrite, and bismuth oxycarbonate; and bismuth lactate, triphenylbismuth, bismuth gallate, bismuth benzoate, bismuth citrate, bismuth methoxyacetate, bismuth acetate, bismuth formate, bismuth 2,2-dimethylolpropionate, and the like.

Examples of compounds that generate yttrium ions include yttrium nitrate, yttrium acetate, yttrium chloride, yttrium sulfamate, yttrium lactate, yttrium formate, and the like.

Examples of compounds that generate iron ions include iron(II) chloride, iron(III) chloride, ammonium iron(III)

citrate, ammonium iron(III) oxalate, iron(III) nitrate, iron (III) fluoride, iron(III) sulfate, ammonium iron(III) sulfate, and the like.

Examples of compounds that generate nickel ions include nickel(II) chloride, nickel(II) acetate, nickel(II) citrate, nickel(II) oxalate, nickel(II) nitrate, nickel(II) sulfamate, nickel (II) carbonate, nickel(II) sulfate, nickel(II) fluoride, and the like. Examples of compounds that generate manganese ions include manganese(II) acetate, manganese(III) acetate, manganese(II) oxalate, manganese(II) nitrate, manganese(II) carbonate, manganese(II) sulfate, ammonium manganese(II) sulfate, and the like.

Examples of compounds that generate gallium ions include gallium nitrate.

Examples of compounds that generate silver ions include silver(I) acetate, silver(I) chloride, silver(I) nitrate, and silver(I) sulfate.

In relation to lanthanoid metal compounds, examples of compounds that generate lanthanum ions include lanthanum nitrate, lanthanum fluoride, lanthanum acetate, lanthanum boride, lanthanum phosphate, lanthanum carbonate, and the like; examples of compounds that generate cerium ions include cerium(III) nitrate, cerium(III) chloride, cerium(III) acetate, cerium(III) oxalate, ammonium cerium(III) nitrate, diammonium cerium(IV) nitrate, and the like; examples of compounds that generate praseodymium ions include praseodymium nitrate, praseodymium sulfate, praseodymium oxalate, and the like; and examples of compounds that generate neodymium ions include neodymium nitrate, neodymium oxide, and the like.

The metal compound component (M) may further optionally contain at least one metal compound selected from the group consisting of alkali metals (lithium, sodium, potassium, rubidium, cesium, and francium) and alkaline earth metals (beryllium, magnesium, calcium, strontium, barium, and radium).

It is preferable for the metal compound component (M) used in the present invention to contain at least one zirconium compound and aluminium nitrate. It is more preferable for the metal compound component (M) to contain at least one zirconium compound.

Water-Dispersible or Water-Soluble Resin Composition (P)

The chemical conversion treatment solution used in the method for forming a multilayer coating film of the present invention may optionally contain a water-dispersible or water-soluble resin composition (P) in an amount of 0.01 to 40 mass %.

Examples of the water-dispersible or water-soluble resin composition (P) include cationic resin compositions containing, in the molecule, a group that can be converted into cations in an aqueous medium, such as an amino group, an ammonium salt group, a sulfonium salt group, and a phosphonium salt group.

Examples also include anionic resin compositions containing, in the molecule, a group that can be converted into anions in an aqueous medium, such as a carboxyl group, a sulfonic acid group, and a phosphoric acid group. Examples of the types of the resin include epoxy resins, acrylic resins, polybutadiene resins, alkyd resins, and polyester resins.

Among these functional groups, a cationic resin composition containing an amino group in the molecule is preferable because such a cationic resin composition causes no adverse effect even when mixed as a contaminant with a cationic electrodeposition coating composition, because rusting is prevented during the transport of a metal substrate coated with the chemical conversion treatment solution to the cationic electrodeposition coating composition tank, and because corrosion resistance of the resulting coated article is improved. The cationic resin composition containing an amino group is not particularly limited. Preferable examples include amino group-containing epoxy resins; polyallylamines; Mannich-modified, aminated phenolic resins; and the like. These may be used singly, or in a combination of two or more. The resin preferably has an amine value of 30 to 150 mg KOH/g, and more preferably 60 to 130 mg KOH/g, based on the resin solids content.

The water-dispersible or water-soluble resin composition (P) is suitably mixed with a neutralizing agent and dispersed in deionized water to obtain an emulsion, which may be used to prepare the chemical conversion treatment solution.

In addition to the above resin, the components of the chemical conversion treatment solution may also include a resin or compound that contains in the molecule a nonionic and high polar functional group, such as a hydroxyl group and oxyethylene chain, and that is water-dispersible or water-soluble in an aqueous medium. Specific examples of the resin or compound include polyvinyl alcohol, polyoxyethylene, polyvinylpyrrolidone, polyoxypropylene, hydroxyethyl cellulose, hydroxypropylmethyl cellulose, and the like. These may be used singly, or in a combination of two or more.

The resin composition (P) contained in the chemical conversion treatment solution prevents a substrate from rusting while the substrate is transferred to the electrodeposition coating composition tank.

Preparation of Chemical Conversion Treatment Solution

The chemical conversion treatment solution used in the method for forming a multilayer coating film of the present invention may be prepared by using any method without limitation. For example, the following methods (1) to (3) may be used:

(1) a method comprising adding the metal compound component (M) to deionized water and/or the water-dispersible or water-soluble resin composition (P), optionally adding a neutralizing agent, and further adding deionized water;

(2) a method comprising adding deionized water and/or the water-dispersible or water-soluble resin composition (P) to the metal compound component (M);

(3) a method comprising adding the metal compound component (M) and/or the water-dispersible or water-soluble resin composition (P) to a chemical conversion treatment solution that has been previously prepared, and further adding deionized water.

The chemical conversion treatment solution contains the metal compound component (M) at a concentration of generally 30 to 20,000 ppm, preferably 50 to 10,000 ppm, more preferably 100 to 5,000 ppm, particularly preferably 150 to 2,000 ppm, as the total metal content (mass basis); and optionally further contains the water-dispersible or water-soluble resin composition (P) in an amount of generally 0.01 to 40 mass %, preferably 0.02 to 10 mass %, and still more preferably 0.03 to 1 mass %, based on the mass of the chemical conversion treatment solution. It is preferable that the pH be from 1.0 to 8.0, and more preferably 3.0 to 7.0.

The chemical conversion treatment solution used in the method for forming a multilayer coating film (Step 1) of the present invention preferably contains sodium ions at a concentration of less than 2,000 ppm on a mass basis. When the sodium ion concentration is higher than 2,000 ppm, and if a part or all of the water-washing step is omitted, the coatability in electrodeposition coating may be insufficient, and the finished appearance and corrosion resistance of the resulting coating film may be unsatisfactory. The sodium ion concentration in the chemical conversion treatment solution is preferably less than 2,000 ppm, more preferably less than 1,000 ppm, still more preferably less than 500 ppm, and yet still more preferably less than 100 ppm, on a mass basis.

Sodium ions are presumably incorporated into the chemical conversion treatment solution from, for example, starting materials, such as water, an accelerator (e.g., sodium nitrite), a metal compound component (M) mentioned above, and a neutralizing agent, as well as from a degreasing solution and washing water, which are used in the preceding step. For example, a continuous use of a chemical conversion treatment solution in a production line or the like gradually reduces the concentrations of chemical conversion treatment components; therefore, a supply solution is generally added to adjust the concentrations as needed. However, trace amounts of impurity components (e.g., Na ions) in the supply solution or components carried from the previous step gradually accumulate in the chemical conversion treatment solution, causing an adverse effect on the properties. Further, when the impurity components are adhered to and/or deposited on the substrate at a concentration higher than a specific level and are carried into an electrodeposition coating bath used in the subsequent step, adverse effects on the properties are also incurred. In the present invention, a specific ionic concentration in the chemical conversion treatment solution is adjusted to a specific level or less, thereby achieving excellent properties even when the production is continuously performed.

For the same reason as described above, each of the potassium ion concentration, calcium ion concentration, and magnesium ion concentration in the chemical conversion treatment solution on a mass basis is generally preferably less than 2,000 ppm, more preferably less than 1,000 ppm, even more preferably less than 500 ppm, and still even more preferably less than 100 ppm.

The concentrations of sodium ions, potassium ions, calcium ions, and magnesium ions in the chemical conversion treatment solution may be determined by using an atomic absorption analytical method with an atomic absorption spectrometer (trade name: Zeeman atomic absorption photometer, produced by Hitachi).

Method for Forming a Chemical Conversion Coating Film

Examples of the method for forming a chemical conversion coating film include, but are not limited to, (1) a method in which a metal substrate is immersed in a chemical conversion treatment tank filled with a chemical conversion treatment solution for generally 10 to 360 seconds, preferably 50 to 300 seconds, and more preferably 70 to 240 seconds, to form a chemical conversion coating film on the metal substrate; (2) a method in which a metal substrate is immersed in a chemical conversion treatment tank filled with a chemical conversion treatment solution, and electric current is applied generally at 1 to 50 V for 10 to 360 seconds, and preferably 2 to 30 V for 30 to 180 seconds, using the metal substrate as the cathode; (3) a method in which a metal substrate is immersed in a chemical conversion treatment tank filled with a chemical conversion treatment solution for a specific period of time, followed by the application of electric current, the immersion being performed generally for 10 to 180 seconds, and preferably 5 to 120 seconds, the electric current being applied at 1 to 100 V for 10 to 360 seconds, and preferably 2 to 60 V for 30 to 180 seconds; and the like. According to the method of the present invention, a multilayer coating film with reduced unevenness and high corrosion resistance is obtained even when method (1) above, in which application of electric current is not performed, is used.

The mechanism of the chemical conversion coating film deposition is such that the immersion or electric current application increases the pH in the vicinity of the metal substrate and causes a hydrolysis reaction, allowing the metal ionic species in the chemical conversion treatment solution to deposit on the metal substrate as a poorly soluble chemical conversion coating film (metal oxide and/or a part of resin composition (P)), thereby forming a chemical conversion coating film containing the metal compound component (M) and/or the resin composition (P).

The metal substrate having the chemical conversion coating film formed thereon may be appropriately subjected to setting before being subjected to electrodeposition coating, and then immersed in a cationic electrodeposition coating composition tank filled with a cationic electrodeposition coating composition to perform electrodeposition coating. In this manner, an electrodeposition coating film is formed on the chemical conversion coating film. At this time, in the present invention, a part or all of the water-washing step, which was until now performed before electrodeposition coating, can be omitted.

As used herein, phrases such as "omitting a part or all of the water-washing step," and "a part or all of the water-washing step is omitted" mean that at least one water-washing step selected from among industrial-water washing and/or clean-water washing, and pure-water washing can be omitted, in accordance with the required coating film properties. For example, omitting industrial-water washing and clean-water washing and performing only pure-water washing corresponds to "omitting a part or all of the water-washing step." Therefore, "omitting a part or all of the water-washing step" or "a part or all of the water-washing step is omitted" indicates that, for example, either (i) water-washing with industrial-water and/or with clean-water or (ii) pure-water washing is performed, or neither (i) nor (ii) is performed. A method in which both of the above steps (i) and (ii) are performed, but the amount of water used in each step is reduced so that the total amount of water used is equivalent to the amount used in a method in which at least one of the above steps (i) and (ii) is omitted, is substantially equivalent to a method in which at least one of the steps (i) and (ii) is omitted, in terms of the amount of water used. Therefore, in the present invention, this method is also included in the method in which "a part or all of the water-washing step is omitted." Further, as described above, the present invention is directed to a method that omits a part or all of the water-washing step to reduce the time and cost required in the water-washing step, including equipment and cost required for collection, filtration, treatment, and disposal of wastewater generated in the water-washing step. Accordingly, methods that correspond in form to the cases exemplified above, such as a method in which the step (i) is not performed and only the step (ii) of pure water-washing is performed, but the pure-water washing is performed as sufficiently as or more fully than both of the steps (i) and (ii) are performed, do not correspond to "omitting a part or all of the water-washing step"; this is apparent from the spirit of the present invention.

For example, in known methods, the step of washing the substrate with water after a chemical conversion treatment is performed to wash away the chemical conversion solution. Therefore, in order to confirm that the chemical conversion solution has been sufficiently washed away, the electrical conductivity of water is measured after water-washing in the final water-washing step to manage the water-washing step. For example, when the electrical conductivity of water after the final water-washing step is 50 µS/cm or less, the chemical conversion solution is regarded as being sufficiently washed away from the substrate and the water-washing step is thus managed. Accordingly, it is apparent that water-washing methods by which the electrical conductivity of water after water-washing is reduced to a level lower than the electrical conductivity of water after a conventional water-washing step is performed do not correspond to "omitting a part or all of the water-washing step."

The washing method described above may be immersion-washing or spray-washing (spray-atomizing washing, shower-spray washing). In the present invention, any method is appropriately used. To achieve process-streamlining and space-saving, to simplify effluent treatment, and to reduce waste products, it is preferable to use only spray-washing. Spray-washing can remove excess chemical conversion treatment solution from a chemical conversion-treated substrate surface by spraying water for generally 1 to 120 seconds, and preferably for 2 to 60 seconds. Therefore, examples of a method in which "a part or all of the water-washing step is omitted" include a method comprising a step of spraying water for 120 seconds or less, and preferably 60 seconds or less. Examples of such a method also include a method in which water-washing is not performed. In spray-washing, when the substrate has a complicated shape (e.g., a car frame), it is not possible for the entire surface to be sprayed directly; therefore, spraying may be performed only on the external surface, whose finished appearance is considered to be of the greatest importance.

To further achieve process-streamlining and space-saving, further simplify effluent treatment, and further reduce waste products, it is particularly more preferable to omit all of the water-washing step, such as industrial-water washing, clean-water washing, and pure-water washing, including immersion-washing and spray-washing.

The setting before electrodeposition coating is performed under conditions at a temperature of generally 0 to 80° C., preferably 5 to 50° C., and more preferably 10 to 40° C. for generally 10 seconds to 30 minutes, preferably 20 seconds to 20 minutes, and more preferably 30 seconds to 15 minutes. In this manner, excess chemical conversion treatment solution adhered to the metal substrate is removed, making it possible to achieve excellent electrodeposition coatability, and to obtain a multilayer coating film having excellent finished appearance and/or excellent corrosion resistance.

During the setting, the metal substrate may be appropriately subjected to at least one of air-blowing, shaking, and rotating. In this manner, excess chemical conversion treatment solution adhered to the metal substrate is removed to the maximum extent.

The air-blowing may be performed on the substrate surface at an air pressure of generally 0.01 to 1.0 MPa, and preferably 0.05 to 0.5 MPa, for generally 1 second to 10 minutes, and preferably 2 seconds to 3 minutes, at a temperature of generally 0 to 80° C., and preferably 10 to 60° C. In this manner, excess chemical conversion treatment solution is removed from the substrate.

Next, the metal substrate having the chemical conversion coating film formed thereon is immersed in a cationic electrodeposition tank filled with a cationic electrodeposition coating composition, followed by the application of electric current to perform electrodeposition coating on the chemical conversion coating film. A feature of the present invention is that the solution adhered to and/or deposited on the metal substrate immediately before electrodeposition coating has an electrical conductivity of less than 10,000 µS/cm. The solution preferably has an electrical conductivity in the range of more than 60 µS/cm and less than 7,000 µS/cm, more preferably higher than 60 µS/cm and less than 5,000 µS/cm, and particularly preferably more than 60 µS/cm and less than 2,000 µS/cm. In the present invention, "when the electrodeposition coating is performed" refers to "immediately before the electrodeposition coating is performed." The "immediately before electrodeposition coating" refers to the time after the chemical conversion treatment is performed and water-washing is optionally performed, and before the metal substrate having a chemical conversion treatment film formed thereon is immersed in a cationic electrodeposition bath.

To reduce the electric conductivity, a sufficient water-washing step is necessary, thus resulting in difficulty in achieving process-streamlining and space-saving. When the electrical conductivity is higher than the above range, the resulting multilayer film has poor finished appearance and anticorrosion resistance.

The concentration of sodium ions in the solution adhered to and/or deposited on the metal substrate immediately before electrodeposition coating is generally preferably less than 500 ppm, preferably less than 200 ppm, more preferably less than 100 ppm, even more preferably 50 ppm, and particularly preferably less than 10 ppm, on a mass basis.

The concentrations of potassium ions, calcium ions, and magnesium ions in the chemical conversion treatment solution are also each generally preferably less than 500 ppm, more preferably less than 200 ppm, still more preferably less than 100 ppm, and even more preferably less than 50 ppm, and still even more preferably less than 10 ppm, on a mass basis.

Cationic Electrodeposition Coating Composition

The cationic electrodeposition coating composition used in the method for forming a multilayer coating film (step 2) of the present invention is not limited, and any known composition may be used. It is particularly preferable to use a composition containing an amino group-containing epoxy resin (A) and a blocked polyisocyanate (B). The cationic electrodeposition coating composition used in the present invention preferably contains the amino group-containing epoxy resin (A) in an amount of generally 40 to 90 mass %, preferably 55 to 85 mass %, and more preferably 60 to 80 mass %, based on the total resin solids content, as well as the blocked polyisocyanate (B) in an amount of generally 10 to 60 mass %, preferably 15 to 45 mass %, and more preferably 20 to 40 mass %, based on the total resin solids content.

Amino Group-Containing Epoxy Resin (A)

The amino group-containing epoxy resin (A) may be obtained by reacting an epoxy resin (a1) and an amine compound (a2), and optionally a modifier. Examples of amino group-containing epoxy resins include (1) adducts of an epoxy resin with a primary amine compound, a secondary amine compound, or a compound of a mixture of primary and secondary amines (see, for example, U.S. Pat. No. 3,984,299); (2) an adduct of an epoxy resin with a ketiminized amine compound (see, for example, U.S. Pat. No. 4,017,438); (3) a reaction product obtained by etherification of an epoxy resin with a hydroxy compound having a ketiminized primary amino group (see, for example, JP59-43013A); and the like.

Epoxy Resin (a1) The epoxy resin (a1) usable in the production of the amino group-containing epoxy resin (A) include a compound containing at least one, and preferably two or more, epoxy groups per molecule; and having a number average molecular weight of generally at least 300, preferably 400 to 4,000, and more preferably 800 to 2,500, and an epoxy equivalent of at least 160, preferably 180 to 2,500, and more preferably 400 to 1,500. In particular, an epoxy resin obtained by reacting a polyphenol compound and epihalohydrin is preferable.

Examples of polyphenol compounds that can be used for forming the epoxy resin (a1) include bis(4-hydroxyphenyl)-2,2-propane [bisphenol A], bis(4-hydroxyphenyl)methane [bisphenol F], bis(4-hydroxycyclohexyl)methane [hydrogenated bisphenol F], 2,2-bis(4-hydroxycyclohexyl)propane [hydrogenated bisphenol A], 4,4'-dihydroxybenzophenone, bis(4-hydroxyphenyl)-1,1-ethane, bis(4-hydroxyphenyl)-1,1-isobutane, bis(4-hydroxy-3-tert-butyl-phenyl)-2,2-propane, bis(2-hydroxynaphthyl)methane, tetra(4-hydroxyphenyl)-1,1,2,2-ethane, 4,4'-dihydroxydiphenylsulfone, phenol novolak, cresol novolak, and the like. These may be used singly, or in a combination of two or more.

Preferable resins as the epoxy resin (a1) obtained by reacting a polyphenol compound with epichlorohydrin are preferably those derived from bisphenol A and represented by the following formula:

wherein n is preferably 0 to 8.

Examples of commercially available products of the epoxy resin (a1) include products sold under the trade names of jER828EL, jER1002, jER1004, and jER1007 by Mitsubishi Chemical Corporation.

The bisphenol-type epoxy resin may either be a resin obtained by condensing, for example, epichlorohydrin and bisphenol to a high-molecular-weight resin optionally in the presence of a catalyst, such as an alkali catalyst, or a resin obtained by condensing epichlorohydrin and bisphenol to a low-molecular-weight epoxy resin optionally in the presence of a catalyst, such as an alkali catalyst; and subjecting this low-molecular-weight epoxy resin to a polyaddition reaction with bisphenol.

In this specification, the number average molecular weight is a polystyrene equivalent molecular weight that is determined from the retention time (retention volume) measured by gel permeation chromatography (GPC) based on the retention time (retention volume) of a standard polystyrene with a known molecular weight measured under the same conditions. More specifically, the measurement is performed using a gel permeation chromatography apparatus (HLC8120GPC (trade name), produced by Tosoh Corporation) together with four columns (TSKgel G-4000HXL, TSKgel G-3000HXL, TSKgel G-2500HXL, and TSKgel G-2000XL, trade names, all produced by Tosoh Corporation) under the following conditions: mobile phase: tetrahydrofuran; measurement temperature: 40° C.; flow rate: 1 mL/min; and detector: RI.

Amine Compound (a2)

The amine compound (a2) used as a starting material of the amino group-containing epoxy resin (A) is not limited as long as it has reactivity with the epoxy resin (a1). Examples include monoalkylamines or dialkylamines, such as monomethylamine, dimethylamine, monooctylamine, diethylamine, dipropylamine, dibutylamine, dihexylamine, dioctylamine, monoisopropylamine, diisopropylamine, monobutylamine, monooctylamine, methylbutylamine, and dibutylamine; alkanolamines, such as monoethanolamine, N-methyletha-nolamine, N-ethylethanolamine, diethanolamine, mono(2-hydroxypropyl)amine, di(2-hydroxypropyl)amine, N-butylethanolamine, dipropanolamine, monomethylaminoethanol, N-(2-hydroxypropyl)ethylenediamine, 3-methylamine-1,2-propanediol, 3-tert-butylamino-1,2-propanediol, N-methylglucamine, and N-octylglucamine; alkylenepolyamines, such as polymethylenediamine, polyetherdiamine, ethylenediamine, propylenediamine, butylenediamine, hexamethylenediamine, trimethylhexamethylenediamine, dimethylaminopropylamine, diethylenetriamine, diethylaminopropylamine, dipropylenetriamine, dibutylenetriamine, bis(hexamethylene)triamine, bis(4-aminobutyl)amine, triethylenetetramine, tetraethylenepentamine, pentaethylenehexamine; aromatic or alicyclic polyamines, such as menthanediamine, isophoronediamine, bis(4-amino-3-methylcyclohexyl)methane, metaxylylenediamine, metaphenylenediamine, naphthylenediamine, and dimethylaminomethylbenzene; heterocyclic polyamines, such as piperazine, 1-methylpiperazine, 3-pyrrolidinol, 3-piperidinol, and 4-pyrrolidinol; epoxy-added polyamines obtained by adding 1 to 30 mol of epoxy-containing compound per mol of the polyamines; polyamide polyamines that contains one or more primary or secondary amines in the polyamide resin molecule and that is produced by condensation of the polyamines with aromatic acid anhydrides, alicyclic acid anhydrides, aliphatic acid anhydrides, halogenated acid anhydrides and/or dimer acids; ketiminized amines obtained by reacting one or more primary or secondary amines of the polyamines with ketone compounds; and the like. These may be used singly, or in a combination of two or more. The ketone compounds used for producing the ketiminized amines are not limited as long as they react with the primary or secondary amines of the polyamines to form a ketimine compound, and as long as they are hydrolyzed in an aqueous coating composition. Examples include methyl isopropyl ketone (MIPK), diisobutyl ketone (DIBK), methyl isobutyl ketone (MIBK), diethyl ketone (DEK), ethyl butyl ketone (EBK), ethyl propyl ketone (EPK), dipropyl ketone (DPK), methylethylketone (MEK), and the like. Of these, methyl isobutyl ketone (MIBK) is preferable. These ketones may be used singly, or in a combination of two or more.

It is preferable for the amino group-containing epoxy resin (A) to have an amine value of 40 to 80 mg KOH/g, and more preferably 45 to 65 mg KOH/g, to achieve excellent corrosion resistance of the resulting coating film and to prevent unevenness of the coating film when dried.

Modifier

The amino group-containing epoxy resin (A) may be optionally modified with a modifier. The modifier is not limited as long as it is a resin or compound that is reactive with the epoxy resin (a1). Examples include acidic compounds, such as acetic acid, propionic acid, butyric acid, valeric acid, acrylic acid, oleic acid, glycolic acid, lactic acid, benzoic acid, gallic acid, fatty acid, and dibasic acid; monohydric alcohols, such as methanol, ethanol, n-propanol, isopropanol, n-butanol, 2-butanol, pentanol, hexanol, n-octanol, 2-ethylhexanol, dodecyl alcohol, stearyl alcohol, and benzyl alcohol; polyols; polyether polyols; polyester polyols; polyamide amines; polyisocyanate compounds; lactones, such as γ-butyrolactone and ε-caprolactone; compounds obtained by reacting polyisocyanate compounds with lactones, such as ε-caprolactone; acrylic monomers; compounds obtained by polymerization reaction of one or more acrylic monomers; xyleneformaldehyde compounds; and the like. These may be used singly, or in a combination of two or more.

The reaction of the epoxy resin (a1) with the amine compound (a2), and optionally with the modifier may be performed generally in an appropriate organic solvent at a reaction temperature of about 80 to 170° C., and preferably about 90 to 150° C., for about 1 to 6 hours, and preferably about 1 to 5 hours.

Examples of the organic solvent include hydrocarbon-based solvents, such as toluene, xylene, cyclohexane, and n-hexane; ester-based solvents, such as methyl acetate, ethyl acetate, and butyl acetate; ketone-based solvents, such as acetone, methyl ethyl ketone, methyl isobutyl ketone, and methyl amyl ketone; amide-based solvents, such as dimethylformamide, and dimethylacetamide; alcohol-based solvents, such as methanol, ethanol, n-propanol, and iso-propanol; ether alcohol-based compounds, such as ethylene glycol monobutyl ether and diethylene glycol monoethyl ether; mixtures of these organic solvents; and the like.

The amount of the modifier used is not strictly limited, and may be appropriately adjusted according to the usage etc. of the cationic electrodeposition coating composition. To improve the finished appearance and the corrosion resistance, it is appropriate to use the modifier in an amount of 3 to 50 mass %, and preferably 5 to 30 mass %, based on the solids mass of the amino group-containing epoxy resin (A).

The amino group-containing epoxy resin (A) used in the present invention is not particularly limited. In addition to the above, the following resins may optionally be used: amino group-containing epoxy resins obtained by reacting an oxazolidinone ring-containing epoxy resins with amino group-containing compounds (e.g., JPH05-306327A); amino group-containing modified epoxy resins obtained by reacting epoxy resins having an alkylene oxide structure with amino group-containing compounds (e.g., JP2011-847723A); xyleneformaldehyde resin-modified amino group-containing epoxy resins obtained by reacting epoxy resins with xyleneformaldehyde resins and amino group-containing compounds (e.g., JP2003-221547A); and the like. These may be used singly, or in a combination of two or more.

Blocked Polyisocyanate (B)

The blocked polyisocyanate (B) is a reaction product obtained by addition reaction of a polyisocyanate compound and an isocyanate blocking agent. The polyisocyanate compound used in the blocked polyisocyanate (B) is not limited, and any known compound may be used. Examples include aromatic polyisocyanate compounds, such as tolylene diisocyanate, xylylene diisocyanate, phenylene diisocyanate, diphenylmethane-2,2'-diisocyanate, diphenylmethane-2,4'-diisocyanate, diphenylmethane-4,4'-diisocyanate, and crude MDI (polymethylene polyphenyl isocyanate); alicyclic polyisocyanate compounds, such as bis(isocyanatemethyl) cyclohexane and isophorone diisocyanate; aliphatic polyisocyanate compounds, such as tetramethylene diisocyanate, hexamethylene diisocyanate, and methylene diisocyanate; cyclized polymers or biurets of these polyisocyanate compounds; and combinations of these compounds.

To improve the corrosion resistance, it is particularly preferable to use aromatic polyisocyanate compounds, such as tolylene diisocyanate, xylylene diisocyanate, phenylene diisocyanate, diphenylmethane-2,4'-diisocyanate, diphenylmethane-4,4'-diisocyanate, and crude MDI.

The isocyanate blocking agent blocks isocyanate groups of polyisocyanate compounds through addition to the isocyanate groups. The blocked polyisocyanate compounds produced by the addition reaction are stable at room temperature. When heated to a film-baking temperature (generally about 100 to 200° C.), however, the blocking agent dissociates to thereby regenerate free isocyanate groups.

The isocyanate blocking agent used in the blocked polyisocyanate (B) is not limited, and any known agent may be used. Examples include methylethylketoxime, cyclohexanone oxime, and like oxime-based compounds; phenol, para-t-butylphenol, cresol, and like phenol-based compounds; n-butanol, 2-ethylhexanol, phenylcarbinol, methylphenylcarbinol, ethylene glycol monobutyl ether, diethylene glycol monoethyl ether, ethylene glycol, propylene glycol, and like alcohol-based compounds; ε-caprolactam, γ-butyrolactam, and like lactam-based compounds; dimethyl malonate, diethyl malonate, ethyl acetoacetate, methyl acetoacetate, acetylacetone, and like active methylene-based compounds; and the like. These may be used singly, or in a combination of two or more.

Other Components of Cationic Electrodeposition Coating Composition

In addition to the components (A) and (B) above, the cationic electrodeposition coating composition may optionally contain, for example, a modified epoxy resin that is substantially free from amino groups and that is obtained by reacting an epoxy resin with a polyhydric alcohol, and a polyester resin obtained by reacting a polybasic acid with a polyhydric alcohol. The amount of the modified epoxy resin and/or the polyester resin, when contained in the cationic electrodeposition coating composition, is generally 3 to 50 parts by mass, preferably 10 to 45 mass %, based on 100 parts by mass of the total solids content of the components (A) and (B).

The cationic electrodeposition coating composition may further optionally contain various additives, such as a surfactant, a surface control agent, a pigment-dispersed paste, water, an organic solvent, a neutralizing agent, and the like. These components may be sufficiently mixed, and dissolved or dispersed in water to prepare the cationic electrodeposition coating composition.

As the neutralizing agent, known organic acids and inorganic acids may be used without limitation. It is particularly preferable to use formic acid, lactic acid, acetic acid, or mixtures thereof.

The pigment-dispersed paste comprises a dispersion of fine particles of pigments such as a coloring pigment, a rust-preventive pigment, and an extender pigment. The pigment-dispersed paste may be prepared, for example, by mixing a resin for pigment dispersion, a neutralizing agent, and pigments, and subjecting the mixture to dispersion treatment in a dispersing mixer, such as a ball mill, a sand mill, or a pebble mill.

Known resins may be used as the resin for pigment dispersion. Examples include resins having hydroxyl and cationic groups, such as epoxy resins and acrylic resins; surfactants; tertiary amine-type epoxy resins; quaternary ammonium salt-type epoxy resins; tertiary sulfonium salt-type epoxy resins; and the like. These may be used singly, or in a combination of two or more.

There is no particular limitation to the pigments above. Examples include coloring pigments, such as titanium oxide, carbon black, and colcothar; extender pigments, such as clay, mica, baryta, calcium carbonate, and silica; and rust-preventive pigments, such as aluminum phosphomolybdate, aluminum tripolyphosphate, and zinc oxide (zinc white); and the like.

To prevent corrosion, bismuth compounds may also be incorporated. Examples of bismuth compounds include organic acid bismuth, such as bismuth oxide, bismuth hydroxide, basic bismuth carbonate, bismuth nitrate, bismuth silicate, bismuth lactate, and bismuth salicylate.

To improve coating film curability, an organic tin compound, such as dibutyltin dibenzoate, dioctyltin oxide, and dibutyltin oxide, may be used.

Electrodeposition Coating

The cationic electrodeposition coating composition used in the method for forming a multilayer coating film (step 2) of the present invention may be used to perform electrodeposition coating on a metal substrate on which a chemical conversion coating film is formed without performing a part or any of the water-washing step. The electrodeposition coating is generally performed by adjusting the temperature of an electrodeposition bath to 15 to 35° C., and applying a current at a load voltage of 100 to 400 V using a substrate as a cathode. The coating composition bath comprises a cationic electrodeposition coating composition diluted with deionized water or the like to a solids content of about 5 to 40 mass %, and preferably 8 to 25 mass %, and to a pH of 1.0 to 9.0, and preferably 3.0 to 7.0.

In general, after the electrodeposition coating, the coated substrate is fully washed with ultrafiltrate (UF filtrate), reverse-osmosis water (RO water), industrial water, pure water, or the like, to remove the cationic electrodeposition coating composition excessively adhered to the substrate.

The thickness of the electrodeposition coating film obtained by using the cationic electrodeposition coating composition is not particularly limited, but is generally 5 to 40 μm, and preferably 10 to 30 μm, based on the thickness of the dry coating film. The bake-drying of the coating film is performed by heating the electrodeposition coating film at a surface temperature of the coated article of 110 to 200° C., and preferably 140 to 180° C., for 10 to 180 minutes, and preferably 20 to 60 minutes, with a dryer, such as an electric hot-air dryer or a gas hot-air dryer. By such bake-drying, a cured coating film is obtained.

EXAMPLES

The present invention is explained in detail below with reference to Production Examples, Examples, and Comparative Examples; however, the present invention is not limited to these. In the Examples, "parts," "%," and "ppm" are by mass.

Production of Chemical Conversion Treatment Solution

Production Example 1

Aluminium nitrate, calcium nitrate, and potassium nitrate, which had been diluted with deionized water, and hexafluorozirconic acid were blended with deionized water under vigorous stirring using Disper.

The resulting mixture was further diluted with clean water and/or deionized water. Then, nitric acid, sodium nitrate, ammonium nitrate, magnesium nitrate, hydrofluoric acid, ammonia, and/or sodium hydroxide were added thereto so that the resulting mixture had a pH of 3.8, and contained 500 ppm of zirconium ions, 100 ppm of aluminum ions, 85 ppm of sodium ions, 85 ppm of potassium ions, 85 ppm of calcium ions, and 85 ppm of magnesium ions as the metal elements. In this manner, chemical conversion treatment solution X-1 was obtained.

Production Examples 2 to 31

Chemical conversion treatment solutions X-2 to X-31 were obtained as in Production Example 1, except that the compositions shown in Table 1 below were used.

TABLE 1

| | | Production Example | | | | | | | |
|---|---|---|---|---|---|---|---|---|---|
| | | 1 | 2 | 3 | 4 | 5 | 6 | 7 | 8 |
| Name of chemical conversion treatment solution | | X-1 | X-2 | X-3 | X-4 | X-5 | X-6 | X-7 | X-8 |
| Ion concentration | Sodium ion | 85 | 150 | 0 | 0 | 0 | 1300 | 400 | 900 |
| | Potassium ion | 85 | 150 | 0 | 0 | 1300 | 1300 | 400 | 900 |
| | Calcium ion | 85 | 150 | 0 | 1300 | 1300 | 1300 | 400 | 900 |
| | Magnesium ion | 85 | 150 | 1300 | 1300 | 1300 | 1300 | 400 | 900 |
| Metal (M) | Zirconium ion | 500 | 500 | 500 | 500 | 500 | 500 | 500 | 500 |
| | Aluminum ion | 100 | 100 | 100 | 100 | 100 | 100 | 100 | 100 |
| Resin (P) | P-1 (Note 1) | | | | | | | | |
| | P-2 (Note 2) | | | | | | | | |

| | | Production Example | | | | | | |
|---|---|---|---|---|---|---|---|---|
| | | 9 | 10 | 11 | 12 | 13 | 14 | 15 |
| Name of chemical conversion treatment solution | | X-9 | X-10 | X-11 | X-12 | X-13 | X-14 | X-15 |
| Ion concentration | Sodium ion | 1500 | 150 | 150 | 150 | 150 | 1800 | 7 |
| | Potassium ion | 1500 | 150 | 150 | 150 | 150 | 1800 | 7 |
| | Calcium ion | 1500 | 150 | 150 | 150 | 150 | 1800 | 7 |
| | Magnesium ion | 1500 | 150 | 150 | 150 | 150 | 1800 | 7 |
| Metal (M) | Zirconium ion | 500 | 500 | 500 | 3000 | 6000 | 500 | 500 |
| | Aluminum ion | 100 | 100 | 100 | 100 | 100 | 100 | 100 |
| Resin (P) | P-1 (Note 1) | | | 500 | | | | |
| | P-2 (Note 2) | | | | 500 | | | |

TABLE 1-continued

| | | Production Example | | | | | | | |
|---|---|---|---|---|---|---|---|---|---|
| | | 16 | 17 | 18 | 19 | 20 | 21 | 22 | 23 |
| | Chemical conversion treatment name | X-16 | X-17 | X-18 | X-19 | X-20 | X-21 | X-22 | X-23 |
| Ion concentration | Sodium ion | 20 | 180 | 300 | 650 | 150 | 150 | 150 | 300 |
| | Potassium ion | 20 | 180 | 300 | 150 | 650 | 150 | 150 | 0 |
| | Calcium ion | 20 | 180 | 300 | 150 | 150 | 650 | 150 | 300 |
| | Magnesium ion | 20 | 180 | 300 | 150 | 150 | 150 | 650 | 300 |
| Metal (M) | Zirconium ion | 500 | 500 | 500 | 500 | 500 | 500 | 500 | 500 |
| | Aluminum ion | 100 | 100 | 100 | 100 | 100 | 100 | 100 | 100 |
| Resin (P) | P-1 (Note 1) | | | | | | | | |
| | P-2 (Note 2) | | | | | | | | |

| | | Production Example | | | | | | | |
|---|---|---|---|---|---|---|---|---|---|
| | | 24 | 25 | 26 | 27 | 28 | 29 | 30 | 31 |
| | Chemical conversion treatment name | X-24 | X-25 | X-26 | X-27 | X-28 | X-29 | X-30 | X-31 |
| Ion concentration | Sodium ion | 0 | 300 | 300 | 220 | 600 | 3000 | 5000 | 85 |
| | Potassium ion | 300 | 300 | 300 | 220 | 600 | 3000 | 5000 | 85 |
| | Calcium ion | 300 | 300 | 0 | 220 | 600 | 3000 | 5000 | 85 |
| | Magnesium ion | 300 | 0 | 300 | 220 | 600 | 3000 | 5000 | 85 |
| Metal (M) | Zirconium ion | 500 | 500 | 500 | 500 | 500 | 500 | 500 | 500 |
| | Aluminum ion | 100 | 100 | 100 | 100 | 100 | 100 | 100 | 0 |
| Resin (P) | P-1 (Note 1) | | | | | | | | |
| | P-2 (Note 2) | | | | | | | | |

The amounts shown in the tables are all based on solids concentration (ppm) on a mass basis.

Note 1: P-1: PAA-01 (trade name, produced by Nitto Boseki Co., Ltd., polyallylamine, weight average molecular weight: 1,600).

Note 2: P-2: Mannich-modified, aminated phenolic resin. (120 parts of Maruka Lyncur S-2P (trade name, produced by Maruzen Petrochemical Co., Ltd., poly-4-vinylphenol) and 120 parts of ethylene glycol monobutyl ether were placed in a flask equipped with a stirrer, a thermometer, a dropping funnel, and a reflux condenser, and the mixture was heated to 90° C. to dissolve the poly-4-vinylphenol. Subsequently, 35 parts of monomethylethanolamine, 40 parts of 37% formalin, 10 parts of ethylene glycol monobutyl ether were added thereto, and the mixture was reacted at 90° C. for 4 hours, followed by further addition of ethylene glycol monobutyl ether to adjust the solids content to 40%.)

Production Example 32

Zinc ion: 1,500 ppm
Nickel ion: 500 ppm
Phosphoric acid ion: 13,500 ppm
Fluorine ion: 500 ppm
Nitrate ion: 6,000 ppm
Nitrite ion: 100 ppm
Sodium ion: 85 ppm
Calcium ion: 85 ppm
Potassium ion: 85 ppm
Magnesium ion: 85 ppm Chemical conversion treatment solution X-32 having the above composition was prepared.

Production Example 33

Zinc ion: 1,500 ppm
Nickel ion: 500 ppm
Phosphate ion: 13,500 ppm
Fluorine ion: 500 ppm
Nitrate ion: 6,000 ppm
Nitrite ion: 100 ppm
Sodium ion: 300 ppm
Calcium ion: 300 ppm
Magnesium ion: 300 ppm
Potassium ion: 300 ppm Chemical conversion treatment solution X-33 having the above composition was prepared.

Production of Amino Group-Containing Epoxy Resin (A)

Production Example 34

1,200 parts of jER828EL (trade name, an epoxy resin produced by Japan Epoxy Resin Co., Ltd., epoxy equivalent: 190; number average molecular weight: 350), 500 parts of bisphenol A, and 0.2 parts of dimethylbenzylamine were placed in a flask equipped with a stirrer, a thermometer, a nitrogen-inlet tube, and a reflux condenser, and the mixture was reacted at 130° C. until the epoxy equivalent was 850. Thereafter, 160 parts of diethanolamine and 65 parts of ketiminized product of diethylenetriamine and methyl isobutyl ketone were added, and the mixture was reacted at 120° C. for 4 hours, followed by addition of 480 g of ethylene glycol monobutyl ether to obtain an amino group-containing epoxy resin A-1 having a solids content of 80%. This amino group-containing epoxy resin A-1 had an amine value of 59 mg KOH/g and a number average molecular weight of 2,100.

Production of Blocked Polyisocyanate (B)

Production Example 35

270 parts of Cosmonate M-200 (trade name, produced by Mitsui Chemicals, Inc., crude MDI, NCO group content: 31.3%), and 127 parts of methyl isobutyl ketone were placed in a reactor, and the mixture was heated to 70° C. Afterward, 236 parts of ethylene glycol monobutyl ether was added thereto dropwise over 1 hour, and the mixture was then heated to 100° C. While maintaining this temperature, the mixture was sampled over time, and infrared absorption spectroscopic measurements were performed to confirm no absorption of unreacted isocyanate groups. In this manner, a blocked polyisocyanate B-1 having a resin solids content of 80% was obtained.

Production of Resin for Pigment Dispersion

Production Example 36

In a flask equipped with a stirrer, a thermometer, a dropping funnel, and a reflux condenser, 390 parts of bisphenol A, 240 parts of Placcel 212 (polycaprolactone diol, produced by Daicel Chemical Industries, Ltd., trade name, weight average molecular weight: about 1,250), and 0.2 parts of dimethylbenzylamine were added to 1,010 parts of jER828EL (produced by Japan Epoxy Resin Co., Ltd., trade name, an epoxy resin). A reaction was allowed to proceed at 130° C. until the epoxy equivalent became about 1090. Next, 134 parts of dimethylethanolamine and 150 parts of a 90% aqueous lactic acid solution were added, and the mixture was allowed to react at 120° C. for 4 hours. Subsequently, methyl isobutyl ketone was added to adjust the solids content, thereby obtaining an ammonium salt resin for pigment dispersion having a solids content of 60%.

Production of Pigment-Dispersed Paste

Production Example 37

8.3 parts (solids content: 5 parts) of the resin for pigment dispersion with a solids content of 60% obtained in Production Example 36, 14.5 parts of titanium oxide, 7.0 parts of refined clay, 0.3 parts of carbon black, 1 part of dioctyltin oxide, 1 part of bismuth hydroxide, and 20.3 parts of deionized water were dispersed in a ball mill for 20 hours, thereby obtaining a pigment-dispersed paste having a solids content of 55%.

Production of Cationic Electrodeposition Coating Composition

Production Example 34

87.5 parts (solids content: 70 parts) of amino group-containing epoxy resin A-1 obtained in Production Example 34 and 37.5 parts (solids content: 30 parts) of blocked polyisocyanate B-1 obtained in Production Example 35 were mixed, and 13 parts of 10% acetic acid was further added to the mixture. After the mixture was uniformly stirred, deionized water was added dropwise with vigorous stirring over a period of about 15 minutes to obtain an emulsion having a solids content of 34%.

Thereafter, 294 parts (solids content: 100 parts) of the emulsion obtained above, 52.4 parts (solids content: 28.8 parts) of 55% pigment-dispersed paste obtained in Production Example 37, and 350 parts of deionized water were mixed to obtain a cationic electrodeposition coating composition Y-1 having a solids content of 20%.

Production of Test Plate

Example 1

Test plate Z-1 was produced according to the following steps 1-1 to 2-3.
Step 1 (Degreasing, Surface Conditioning, and Chemical Conversion Treatment)
Step 1-1: A cold-rolled steel plate (70 mm×150 mm×0.8 mm) was degreased by immersion for 120 seconds in 2.0 mass % of Fine Cleaner L4460 (produced by Nihon Parkerizing Co., Ltd., an alkaline-degreasing agent) adjusted to 43° C.
Step 1-2: The steel plate above was subjected to surface conditioning by immersion for 30 seconds in a 0.15% aqueous solution of Preparen 4040N (produced by Nihon Parkerizing Co., Ltd., a surface control agent) at ordinary temperature, and the resulting product was washed by spraying pure water for 30 seconds.
Step 1-3: The above steel plate was subjected to chemical conversion treatment by immersion for 120 seconds in the chemical conversion treatment solution X-1 obtained in Production Example 1 adjusted to 43° C.
Step 2 (washing, electrodeposition coating, and bake-drying)
Step 2-1: The steel plate, on which a chemical conversion coating film was formed in step 1, was subjected to washing by immersion in pure water for 30 seconds (equivalent to water-washing step II mentioned later).
Step 2-2: The above steel plate was subjected to electrodeposition coating at 250 V for 180 seconds (voltage rise period: 30 seconds) by immersion in a bath of the cationic electrodeposition coating composition Y-1 (Production Example 38) adjusted to 28° C.
Step 2-3: The above steel plate was subjected to washing by immersion once in clean water for 120 seconds and once in pure water for 120 seconds, and to bake-drying at 170° C. for 20 minutes in an electric drier, thereby obtaining test plate Z-1 having a multilayer coating film with a film thickness of 22 μm when dried.

Examples 2 to 33 and Comparative Examples 1 to 4

Test plates Z-2 to Z-37 were obtained as in Example 1, except that the chemical conversion treatment solutions and/or the water-washing steps shown in Table 2 below were used. With respect to the obtained test plates, tests were performed to evaluate the finished appearance, such as unevenness and corrosion resistance. Table 2 below also shows the evaluation results. The details of the water-washing steps used in the Examples and the Comparative Examples, as well as the method for measuring ion concentrations, the method for measuring electrical conductivity, and the method for evaluating unevenness and corrosion resistance are described below.
Water-Washing Step
The following describes the water-washing step (Step 2-1) used in the Examples or the Comparative Examples. From the viewpoint of process-streamlining, a shorter step is preferable. Also from the viewpoints of environment and economy, it is more preferable that the step uses less washing water. In the following water-washing steps II to V, a part or all of the water-washing step is omitted from known water-washing step I.
Water-washing step I: After chemical conversion treatment, a substrate is washed with water by immersion in clean water once for 30 seconds, followed by washing by immersion in pure water once for 30 seconds. This is a known water-washing step (water-washing by immersion: twice or more) and is the longest step.

Water-washing step II: After chemical conversion treatment, a substrate is washed with water by immersion in pure water once for 30 seconds. This step omits a part of the washing step, compared to the known water-washing step (water-washing by immersion: twice or more).

Water-washing step III: After chemical conversion treatment, a substrate is washed with water by atomized spray of pure water for 3 seconds. This step omits a part of the step, compared to the known water-washing step (water-washing by immersion: twice or more), and is slightly shorter than water-washing step II, which comprises performing washing by immersion once.

Water-washing step IV: After chemical conversion treatment, a water-washing step is not performed, and a substrate is subjected to air-blowing for 10 seconds (at room temperature and air pressure of 0.2 MPa on the substrate surface). This step is short, and no waste water is produced.

Water-washing step V: After chemical conversion treatment, no water-washing step is performed. This is the shortest step, and no waste water is produced.

Ion Concentration

The same test plates as those immediately before being subjected to electrodeposition coating in the Examples and Comparative Examples were separately prepared and placed in an upright state in containers. The containers were covered with lids, and then allowed to stand for 1 hour. Subsequently, the test plates were removed from the containers, and ion concentrations of the solutions residing in the bottom portion of the containers were measured. The ion concentration of each solution was measured using an atomic absorption spectrometer (trade name: Zeeman atomic absorption photometer, produced by Hitachi). When one test plate was not sufficient to obtain an amount required to measure electrical conductivity, two or more test plates were used to obtain the required amount.

Electric Conductivity

The electric conductivity (μS/cm) was measured using the same test samples as those used in the above ion concentration measurement. A DS-12 Conductivity Meter (produced by Horiba, Ltd.) was used to measure the electrical conductivity.

Unevenness

The appearance of each of the obtained test plates was observed to evaluate unevenness as the finished appearance of multilayer coating films. The evaluation was performed based on the following criteria from A (very good) to E (poor).
A: Very uniform.
B: Uniform.
C: Mostly uniform, although slight unevenness is visually confirmed.
D: Slightly poor, with unevenness visually confirmed.
E: Poor, with obvious unevenness.

Corrosion Resistance

Each of the multilayer coating films was cross-cut with a knife so that the cut reached the test plate, and was then subjected to a salt-spray test at 35° C. for 840 hours in accordance with JIS Z-2371. Corrosion resistance was evaluated based on the width of rust and blistering from the cut according to the following criteria. The evaluation was performed based on the following criteria from A (very good) to E (poor).
A: The maximum width of rust and blistering from the cut was 2.0 mm or less (on one side).
B: The maximum width of rust and blistering from the cut was more than 2.0 mm and 2.5 mm or less (on one side).
C: The maximum width of rust and blistering from the cut was more than 2.5 mm and 3.0 mm or less (on one side).
D: The maximum width of rust and blistering from the cut was more than 3.0 mm and 3.5 mm or less (on one side).
E: The maximum width of rust and blistering from the cut was more than 3.5 mm (on one side).

TABLE 2

|  |  | Example | | | | | |
| --- | --- | --- | --- | --- | --- | --- | --- |
|  |  | Example 1 | Example 2 | Example 3 | Example 4 | Example 5 | Example 6 |
|  | Test plate name | Z-1 | Z-2 | Z-3 | Z-4 | Z-5 | Z-6 |
|  | Chemical conversion treatment solution | X-1 | X-1 | X-2 | X-3 | X-4 | X-5 |
|  | Water-washing step | II | III | III | III | III | III |
| Ion concentration | Sodium ion | 3 | 11 | 15 | 0 | 0 | 0 |
|  | Potassium ion | 5 | 11 | 18 | 0 | 0 | 134 |
|  | Calcium ion | 4 | 10 | 16 | 0 | 135 | 152 |
|  | Magnesium ion | 3 | 10 | 16 | 146 | 155 | 135 |
| Electrical conductivity |  | 65 | 400 | 800 | 1800 | 3500 | 5500 |
| Evaluation test | Unevenness | A | A | A | A | B | B |
|  | Corrosion resistance | A | B | B | B | B | C |

|  |  | Example | | | | | |
| --- | --- | --- | --- | --- | --- | --- | --- |
|  |  | Example 7 | Example 8 | Example 9 | Example 10 | Example 11 | Example 12 |
|  | Test plate name | Z-7 | Z-8 | Z-9 | Z-10 | Z-11 | Z-12 |
|  | Chemical conversion treatment solution | X-6 | X-7 | X-8 | X-9 | X-18 | X-10 |
|  | Water-washing step | III | III | III | III | IV | III |
| Ion concentration | Sodium ion | 145 | 40 | 99 | 173 | 297 | 18 |
|  | Potassium ion | 151 | 47 | 99 | 157 | 280 | 16 |
|  | Calcium ion | 148 | 41 | 92 | 178 | 292 | 16 |
|  | Magnesium ion | 137 | 44 | 94 | 158 | 290 | 17 |

TABLE 2-continued

| | | | | | | | |
|---|---|---|---|---|---|---|---|
| Electrical conductivity | | 7200 | 2200 | 5200 | 7500 | 8900 | 820 |
| Evaluation test | Unevenness | C | B | B | C | B | A |
| | Corrosion resistance | C | B | C | C | C | B |

| | | Example | | | | | |
|---|---|---|---|---|---|---|---|
| | | Example 13 | Example 14 | Example 15 | Example 16 | Example 17 | Example 18 |
| Test plate name | | Z-13 | Z-14 | Z-15 | Z-16 | Z-17 | Z-18 |
| Chemical conversion treatment solution name | | X-11 | X-12 | X-13 | X-14 | X-15 | X-16 |
| Water-washing step | | III | III | III | II | V | V |
| Ion concentration | Sodium ion | 16 | 15 | 17 | 69 | 6 | 21 |
| | Potassium ion | 17 | 15 | 16 | 70 | 7 | 21 |
| | Calcium ion | 16 | 18 | 17 | 65 | 7 | 21 |
| | Magnesium ion | 18 | 16 | 15 | 63 | 6 | 20 |
| Electrical conductivity | | 820 | 850 | 900 | 3000 | 200 | 1000 |
| Evaluation test | Unevenness | A | B | B | B | A | A |
| | Corrosion resistance | B | A | A | B | A | B |

| | | Example | | | | | |
|---|---|---|---|---|---|---|---|
| | | Example 19 | Example 20 | Example 21 | Example 22 | Example 23 | Example 24 |
| Test plate name | | Z-19 | Z-20 | Z-21 | Z-22 | Z-23 | Z-24 |
| Chemical conversion treatment solution name | | X-1 | X-17 | X-18 | X-19 | X-20 | X-21 |
| Water-washing step | | V | V | V | V | V | V |
| Ion concentration | Sodium ion | 84 | 167 | 288 | 622 | 147 | 155 |
| | Potassium ion | 79 | 167 | 297 | 141 | 602 | 159 |
| | Calcium ion | 92 | 192 | 307 | 156 | 157 | 695 |
| | Magnesium ion | 88 | 171 | 292 | 146 | 143 | 148 |
| Electrical conductivity | | 3000 | 6500 | 9000 | 6800 | 6800 | 6600 |
| Evaluation test | Unevenness | B | B | C | C | C | C |
| | Corrosion resistance | B | C | C | C | C | C |

| | | Example/Comparative Example | | | | | | |
|---|---|---|---|---|---|---|---|---|
| | | Example 25 | Example 26 | Example 27 | Example 28 | Example 29 | Example 30 | Example 31 |
| Test plate name | | Z-25 | Z-26 | Z-27 | Z-28 | Z-29 | Z-30 | Z-31 |
| Chemical treatment solution name | | X-22 | X-23 | X-24 | X-25 | X-26 | X-32 | X-1 |
| Water-washing step | | V | V | V | V | V | III | I |
| Ion concentration | Sodium ion | 160 | 282 | 0 | 292 | 274 | 9 | 2 |
| | Potassium ion | 142 | 0 | 272 | 302 | 275 | 9 | 4 |
| | Calcium ion | 157 | 282 | 322 | 313 | 0 | 9 | 3 |
| | Magnesium ion | 706 | 320 | 283 | 0 | 299 | 8 | 2 |
| Electrical conductivity | | 6700 | 6300 | 6200 | 6100 | 6200 | 400 | 40 |
| Evaluation test | Unevenness | C | B | B | B | B | B | A |
| | Corrosion resistance | C | C | C | C | C | B | A |

| | | Example/Comparative Example | | | | | |
|---|---|---|---|---|---|---|---|
| | | Example 32 | Example 33 | Comparative Example 1 | Comparative Example 2 | Comparative Example 3 | Comparative Example 4 |
| Test plate name | | Z-32 | Z-33 | Z-34 | Z-35 | Z-36 | Z-37 |
| Chemical treatment solution name | | X-30 | X-31 | X-27 | X-28 | X-29 | X-33 |
| Water-washing step | | I | V | V | V | III | V |
| Ion concentration | Sodium ion | 14 | 79 | 223 | 551 | 325 | 290 |
| | Potassium ion | 15 | 81 | 202 | 548 | 327 | 315 |
| | Calcium ion | 14 | 80 | 234 | 555 | 302 | 297 |
| | Magnesium ion | 13 | 84 | 213 | 642 | 304 | 274 |
| Electrical conductivity | | 300 | 2500 | 12000 | 25000 | 15000 | 12000 |
| Evaluation test | Unevenness | B | A | D | E | D | E |
| | Corrosion resistance | A | B | D | E | D | E |

The invention claimed is:

1. A method for forming a multilayer coating film, the method comprising:

Step 1: immersing a metal substrate in a chemical conversion treatment solution to form a chemical conversion coating film, wherein the chemical conversion treatment solution contains a zirconium compound; optionally performing a water-washing step; and Step 2: performing electrodeposition coating on the metal substrate by using a cationic electrodeposition coating composition to form an electrodeposition coating film, wherein when the electrodeposition coating is performed in Step 2, the chemical conversion treatment solution adhered to and/or deposited on the metal substrate has an electrical conductivity of more than 60 μS/cm and less than 5,000 μS/cm.

2. The method for forming a multilayer coating film according to claim 1, wherein when the electrodeposition coating is performed in Step 2, the chemical conversion treatment solution adhered to and/or deposited on the metal substrate has an electrical conductivity of more than 60 μS/cm and less than or equal to 1,800 μS/cm.

3. The method for forming a multilayer coating film according to claim 1, wherein when the electrodeposition coating is performed in Step 2, the chemical conversion treatment solution adhered to and/or deposited on the metal substrate has an electrical conductivity of more than 60 μS/cm and less than or equal to 1,800 μS/cm.

4. The method for forming a multilayer coating film according to claim 1, wherein the chemical conversion treatment solution adhered to and/or deposited on the metal substrate contains less than 500 ppm of sodium ions, based on the mass of the chemical conversion treatment solution.

5. The method for forming a multilayer coating film according to claim 1, wherein the chemical conversion treatment solution adhered to and/or deposited on the metal substrate contains less than 500 ppm of potassium ions, based on the mass of the chemical conversion treatment solution.

6. The method for forming a multilayer coating film according to claim 1, wherein the chemical conversion treatment solution adhered to and/or deposited on the metal substrate contains less than 500 ppm of calcium ions, based on the mass of the chemical conversion treatment solution.

7. The method for forming a multilayer coating film according to claim 1, wherein the chemical conversion treatment solution adhered to and/or deposited on the metal substrate contains less than 500 ppm of magnesium ions, based on the mass of the chemical conversion treatment solution.

8. The method for forming a multilayer coating film according to claim 1, wherein the chemical conversion treatment solution contains 30 to 20,000 ppm of the zirconium compound and optionally another metal compound selected from the group consisting of titanium, cobalt, aluminum, vanadium, tungsten, molybdenum, copper, zinc, indium, bismuth, yttrium, iron, nickel, manganese, gallium, silver, and lanthanoid metals, as the total metal content on a mass basis.

9. The method for forming a multilayer coating film according to claim 1, wherein the chemical conversion treatment solution contains a water-dispersible or water-soluble resin composition (P) in an amount of 0.01 to 40 mass %.

10. The method for forming a multilayer coating film according to claim 1, wherein the cationic electrodeposition coating composition contains an amino group-containing epoxy resin (A) and a blocked polyisocyanate (B), the amino group-containing epoxy resin (A) being contained in an amount of 40 to 90 mass %, and the blocked polyisocyanate (B) being contained in an amount of 10 to 60 mass %, based on the total resin solids content.

11. The method for forming a multilayer coating film according to claim 1, wherein the metal substrate is subjected to at least one of air-blowing, shaking, and rotating, before performing electrodeposition coating in Step 2.

12. A coated article having a multilayer coating film formed by using the method for forming a multilayer coating film of claim 1.

13. The method for forming a multilayer coating film according to claim 1, wherein when the electrodeposition coating is performed in Step 2, the chemical conversion treatment solution adhered to and/or deposited on the metal substrate has an electrical conductivity of more than 60 μS/cm and less than 1,000 μS/cm.

14. The method for forming a multilayer coating film according to claim 1, wherein the chemical conversion treatment solution contains no less than 7 ppm and less than 500 ppm of sodium ions, no less than 7 ppm and less than 500 ppm of potassium ions, no less than 7 ppm and less than 500 ppm of calcium ions, and no less than 7 ppm and less than 500 ppm of magnesium ions on a mass basis.

* * * * *